United States Patent
Fuerstner

(10) Patent No.: US 11,184,172 B2
(45) Date of Patent: Nov. 23, 2021

(54) PROTECTION DEVICE AND DONGLE AND METHOD FOR USING THE SAME

(71) Applicant: Riddle & Code GmbH, Vienna (AT)

(72) Inventor: Thomas Fuerstner, Il-Madliena (MT)

(73) Assignee: Riddle & Code GmbH, Vienna (AT)

( * ) Notice: Subject to any disclaimer, the term of this patent is extended or adjusted under 35 U.S.C. 154(b) by 307 days.

(21) Appl. No.: 15/735,523

(22) PCT Filed: Jun. 16, 2017

(86) PCT No.: PCT/EP2017/064777
§ 371 (c)(1),
(2) Date: Dec. 11, 2017

(87) PCT Pub. No.: WO2017/216346
PCT Pub. Date: Dec. 21, 2017

(65) Prior Publication Data
US 2019/0349201 A1      Nov. 14, 2019

(30) Foreign Application Priority Data
Jun. 16, 2016   (EP) ...................................... 16174818

(51) Int. Cl.
*H04L 9/32*      (2006.01)
*H04L 9/14*      (2006.01)

(52) U.S. Cl.
CPC .............. *H04L 9/3234* (2013.01); *H04L 9/14* (2013.01); *H04L 9/3247* (2013.01);
(Continued)

(58) Field of Classification Search
CPC ....... H04L 9/3234; H04L 9/3247; H04L 9/14; H04L 2209/38; H04L 9/3271; H04L 2209/56
See application file for complete search history.

(56) References Cited

U.S. PATENT DOCUMENTS

2005/0144142 A1*   6/2005   Takayama .............. G06Q 20/04
                                                                 705/64
2008/0133414 A1*   6/2008   Qin ......................... G06F 21/10
                                                                 705/50
(Continued)

OTHER PUBLICATIONS

Christidis, K. et al., "Blockchains and Smart Contracts for the Internet of Things," IEEE Access vol. 4, Special Section: The Plethora of Research in Internet of Things (IoT), May 10, 2016, 12 pages (Year: 2016).*

(Continued)

*Primary Examiner* — Jeffrey D. Popham
(74) *Attorney, Agent, or Firm* — McCoy Russell LLP

(57) ABSTRACT

Method for suspending a physical protection of an object by a protection device, wherein a host device receives a first and second public key, a third public key and a signed combined identifier incorporating the first and second public keys, wherein the signed identifier is signed with a third private key, which third private key is cryptographically associated with the third public key; the host device requests a search of transactions within a public transaction directory; the host device authenticates the first and second public keys using a signature of the signed identifier; the host device authenticates the protection device and sends an unlock request to the dongle if the search of the transaction directory yields at least one transaction and the first and second public keys, the protection device and the dongle are authentic; and in reaction the dongle sends an unlock command to suspend the protection of the object.

14 Claims, 4 Drawing Sheets

(52) U.S. Cl.
CPC ........ *H04L 9/3271* (2013.01); *H04L 2209/38* (2013.01); *H04L 2209/56* (2013.01)

(56) References Cited

U.S. PATENT DOCUMENTS

| | | |
|---|---|---|
| 2015/0269570 A1 | 9/2015 | Phan et al. |
| 2016/0036788 A1 | 2/2016 | Conrad et al. |
| 2017/0064634 A1* | 3/2017 | Van Horn ............... H04W 4/18 |

OTHER PUBLICATIONS

Christidis, K. et al., "Blockchains and Smart Contracts for the Internet of Things," IEEE Access, vol. 4, Special Section: The Plethora of Research in Internet of Things (IoT), May 10, 2016, 12 pages.

ISA European Patent Office, International Search Report and Written Opinion Issued in Application No. PCT/EP2017/064777, dated Sep. 19, 2017, WIPO, 13 pages.

\* cited by examiner

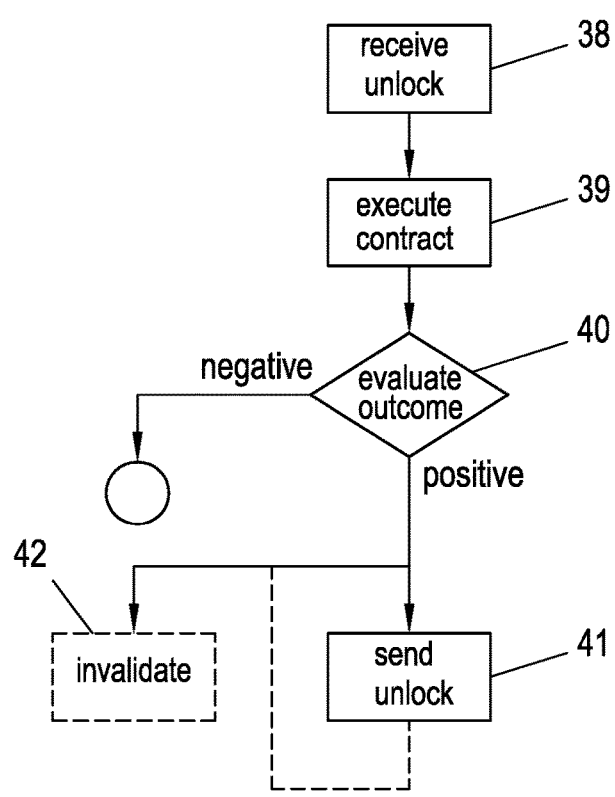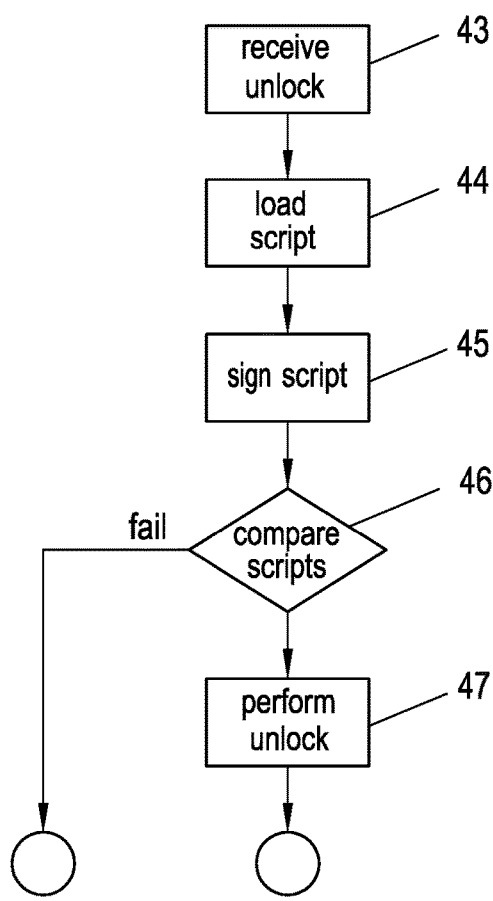
Fig. 7
Fig. 8

PROTECTION DEVICE AND DONGLE AND METHOD FOR USING THE SAME

CROSS-REFERENCE TO RELATED APPLICATIONS

The present application is a U.S. National Phase of International Patent Application Serial No. PCT/EP2017/064777, entitled "PROTECTION DEVICE AND DONGLE AND METHOD FOR USING THE SAME" filed on Jun. 16, 2017. International Patent Application Serial No. PCT/EP2017/064777 claims priority to European Patent Application No. 16174818.1, filed on Jun. 16, 2016. The entire contents of each of the above-cited applications are hereby incorporated by reference in their entirety for all purposes.

TECHNICAL FIELD

The invention concerns a method for suspending a physical protection of an object achieved by a protection device and a set, i.e. a group of associated devices, for physically protecting an object. The object can be a product or packaging of a product or generally any physical item or collection of items that can be physically protected. In particular the object can be a safe, a container, a door, the starter of a car or a valve in a certain position.

BACKGROUND AND SUMMARY

When trading products, the vendor usually has to assure a potential customer that the products on offer are authentic (e.g. originating from a certain producer) and lawfully obtained. This is especially the case with expensive and/or otherwise sensitive products. Vendors will therefore typically obtain the products they offer from sources they trust and lock them up in a protected area, e.g. a safe. Customers have to trust vendors to take appropriate measures to ensure authenticity and lawfulness of the offered products. In practice customers will often rely on the reputation of particular vendors. Only under exceptional circumstances do the customers have additional means to verify for themselves the authenticity and lawfulness of the products at hand. For example that may be the case for products sold together with certificates of ownership issued by the original producer or a certifying third party. The certificates themselves may contain anti-counterfeit measures for security and to combat fake certificates. By offering the product together with the certificate, vendors can prove that the products are authentic (because the certificate is issued by the asserted original producer) and lawfully obtained (otherwise the original certificate would not be available).

However the traditional approach as described above is flawed in that the customers often cannot verify whether the product on offer and the certificate are actually associated. In order to prove an association, products are often marked with a serial number or similar identification feature, which is then reflected in the certificate. But serial numbers can be reproduced, thus weakening the reliability and thus security of the suggested association.

It is an object of the present invention to provide technical means for establishing authenticity and (lawful) ownership of goods, products and other physically protectable objects or items.

The invention solves this object with a method of the kind stated in the outset comprising the following steps:

a first data connection is established between the protection device and a dongle;

a second data connection is established between a host device and the dongle;

a third data connection is established between the host device and a public transaction directory;

the host device receives via the second data connection at least a first public key, a second public key, a third public key and a signed combined identifier incorporating at least the first public key and the second public key, wherein the signed combined identifier is signed with a third private key, which third private key is cryptographically associated with the third public key;

the host device requests via the third data connection a search of transactions associated with the signed combined identifier within the public transaction directory;

the host device authenticates at least the first public key and the second public key using a signature of the signed combined identifier and using the third public key;

the host device authenticates the protection device using the first public key;

the host device authenticates the dongle using the second public key;

if the search of the transaction directory yields at least one transaction and the first public key and second public key are authentic and the protection device is authentic and the dongle is authentic, the host device sends an unlock request to the dongle via the second data connection;

the dongle receives the unlock request and in reaction sends an unlock command via the first data connection controlling an actuator of the protection device to suspend the physical protection of the protected object.

The present method suspends a physical protection of an object achieved by a protection device if and only if the protection device itself as well as a separate dongle are found to be authentic and associated with each other. It uses cryptographically associated keys or "key pairs", which are commonly used in asymmetric cryptography (public-key cryptography). The cryptographic association between a public key and a private key is expressed by the fact that a message (i.e. information) encrypted using the public key can only be decrypted using the respective associated private key and vice-versa. Unlike with paper certificates, the association between the dongle and the protection device can be established and verified cryptographically, such that forgery of the association is impossible for all practical purposes. Furthermore the authenticity of the product is established by the authentication of the public keys received from the protection device and the dongle based on the signature of a trusted third party, e.g. a well-known underwriter or signatory. Correspondingly failure to authenticate the protection device and/or the dongle is in effect similar to an overall absence of the protection device and dongle. Under both circumstances the authenticity of the product cannot be proven and likely has to be denied.

The signed combined identifier serves as a public certificate of the association of the product protected by the protection device with the dongle and the trusted third party (as well as optionally the producer and/or a contract script). As such it is published in a public transaction directory and queried upon access to the protection device. Preferably the directory acts as a write-once storage, meaning that it is protected against modification and deletion of transactions. However transactions may be superseded by later transactions "consuming" earlier transactions, wherein the later transaction is only valid if it is cleared by parties authorized by the consumed earlier transaction. By searching the public transaction directory of transactions associated with the combined identifier, it can be established whether the association documented by the corresponding transaction has been effectively revoked and/or replaced by a valid later transaction, which corresponds to a new association (e.g. with a different dongle). This has the further advantage over traditional paper certificates that e.g. lost certificates can be re-established in a traceable fashion. As an additional security measure, the transactions contain a signature produced by the signatory, which can be used to identify illegitimate transactions in addition to the protection scheme provided by the transaction directory itself.

Correspondingly and to the same advantages the present invention solves the above object with a set of the kind stated in the outset comprising:

a protection device having a controllable actuator for engaging and releasing physical protection of an object and a dongle associated with the protection device, wherein the protection device comprises an internal memory and an interface for establishing a first data connection to the dongle, wherein the internal memory of the protection device stores at least a first private key, wherein the dongle comprises an internal memory, a first interface for establishing a first data connection to the protection device and a second interface for establishing a second data connection to a host device, wherein the internal memory of the dongle stores at least a second private key, a third public key and a signed combined identifier, wherein the signed combined identifier incorporates at least a first public key, which is cryptographically associated with the first private key, and a second public key, which is cryptographically associated with the second private key, and wherein the signed combined identifier is signed with a third private key, which is cryptographically associated with the third public key.

Preferably the steps for authenticating at least the first public key and the second public key by the host device using the signature of the signed combined identifier and using the third public key are:

the host device computes a combined identifier from at least the first public key and the second public key;

the host device compares the computed combined identifier with the signed combined identifier;

the host device verifies the signature of the signed combined identifier with the third public key;

the host device authenticates at least the first public key and the second public key if the two compared combined identifiers match and the verification of the signature succeeds. The computation of the combined identifier follows a pre-determined algorithm, the result of which is reproducible and adheres to a fixed format. The fixed format of the combined identifier ensures that the combined identifier computed from any possible combination of valid public keys can be used to identify a transaction in the public transaction directory. The method of computation for computing the combined identifier is thus chosen to correspond to the formal requirements of the public transaction directory. By signing the combined identifier, the party controlling the third private key (i.e. the signatory or undersigner) certifies the authenticity of both, first and second, public keys as well as the legitimate association between the two and thus between the protection device (controlling the first private key) and the dongle (controlling the second private key).

In order to determine if a given protection device is authentic, it may be verified whether it is indeed in possession and control of the first private key. In particular the steps for authenticating the protection device by the host device can be as follows:

the host device sends a random challenge to the protection device via the second data connection from the host device to the dongle and from there further on via the first data connection to the protection device;

the protection device signs the random challenge using a first private key, which is cryptographically associated with the first public key and stored in an internal memory of the protection device;

the protection device sends the signature of the random challenge to the host device via the first data connection to the dongle and from there via the second data connection to the host device;

the host device verifies the signature with the first public key and authenticates the protection device if the verification succeeds. Since the content of the random challenge is unknown in advance, the protection device can only produce a valid signature of the random challenge after its generation and only if it is in possession of the first private key between the generation of the random challenge and the answer to the host device.

Similarly and with the same advantages, the steps for authenticating the dongle by the host device can be as follows:

the host device sends a random challenge to the dongle via the second data connection;

the dongle signs the random challenge using a second private key, which is cryptographically associated with the second public key and stored in an internal memory of the dongle;

the dongle sends the signature of the random challenge to the host device via the second data connection;

the host device verifies the signature with the second public key and authenticates the dongle if the verification succeeds.

In a preferred embodiment of the invention, the dongle further comprises a stored contract script which can be used to make the suspending of the protection dependent on additional pre-conditions. To this effect the method may include the steps that the dongle receives the unlock request and in reaction executes a contract script stored in an internal memory of the dongle, wherein the contract script evaluates at least one condition for unlocking the protection device, wherein the dongle sends the unlock command only if the contract script executes successfully and the at least one condition of the contract script is fulfilled. The contract script may for instance evaluate a condition based on the current date and time, e.g. whether a certain pre-defined term encoded in the contract script has lapsed. It may also evaluate a condition based on the current location of the protection device as acquired via a location sensor (a GPS device or similar).

Correspondingly the internal memory of the dongle part of the present set may further store a contract script as defined above.

Preferably and in order to provide a coupling of the protection device to a specific contract script, the internal memory of the protection device may further store a signature of a contract script signed with the second private key.

Alternatively or additionally the mutual association between the dongle and the protection device can be further secured if the internal memory of the dongle further stores a signature of the contract script signed with the first private key.

It can be useful to avoid re-use of the protection device, in particular when the protection device is used to guarantee the condition or content of the protected object. In this case, the dongle may be configured to allow for one and only one successful authentication, such that a party performing the authentication can be sure that the protected object has not been tampered with in the time after the transaction certified by the dongle and protection device and before the present authentication. To provide these advantages and render the dongle and/or the protection device useless after a one-time use, the present method can further comprise the steps that after the dongle sends the unlock command, it invalidates or resets its internal memory and/or the internal memory of the protection device.

Advantageously within the present method the protection device receives the second public key and a signed copy of a contract script (preferably the contract script stored in the dongle as mentioned earlier) via the first data connection, loads a stored local copy of the contract script from an internal memory of the protection device, signs the local copy with the first private key, compares the resulting self-signed copy of the contract script with the received signed copy of the contract script and suspends the physical protection of the protected object only if the compared signed contract scripts are identical. By authenticating the unlock request in this way it can be ensured that only legitimate unlock requests actually result in the suspension of the physical protection and forged unlock requests are ignored.

The security of the present method can be increased if the internal memory of the protection device and/or of the dongle is a tamper-proof memory. By using tamper-proof memory, manipulation and in particular extraction of the private keys stored within the protection device and the dongle can be avoided. If an attacker would succeed in extracting the private key of the dongle, they would in principle be able to replicate the dongle and thereby successfully fake ownership of the protected object or product.

In a specific embodiment of the invention, the first data connection can be a wired data connection, preferably using the I2C protocol, and/or the second data connection can be a wireless data connection, preferably a Bluetooth connection. The wired data connection between the protection device and the dongle has the advantage that it is easier to implement, less expensive and at the same time more reliable than a wireless connection. Also the protection device consumes less energy when waiting for input only over a wired connection. Moreover interception of the wired connection during authentication is easier to detect, thereby improving security of the method. Since the dongle is not attached to the protected object or goods, it is easier to recharge and thus can support a wireless connection for more convenient interaction with the host device, especially when the latter does not have any wired data interface (e.g. a smartphone).

The public transaction directory is preferably accessible online, i.e. via the Internet. Accordingly the third data connection can be established via the internet in order to access the most recent transaction data.

It benefits the reliability and independence of the present method when the public transaction directory is a distributed public directory, preferably the Bitcoin block chain. This also furthers the transparency and through transparency trust and ultimately adoption of the present invention. The Bitcoin block chain is particularly well-suited as it provides widely accepted security standards and a trustworthy framework resistant to forgery or manipulation of the recorded transactions.

BRIEF DESCRIPTION OF THE FIGURES

Referring now to the drawings, wherein the figures are for purposes of illustrating the present invention and not for purposes of limiting the same, FIG. 1 schematically shows the elements involved for suspending a physical protection of an object according to the present invention;

FIG. 7 shows in more detail the steps performed by the dongle for implementing a contract script;

FIG. 8 shows in more detail the steps performed by the protection device in order to authenticate an unlock request.

DETAILED DESCRIPTION

Figure 1:
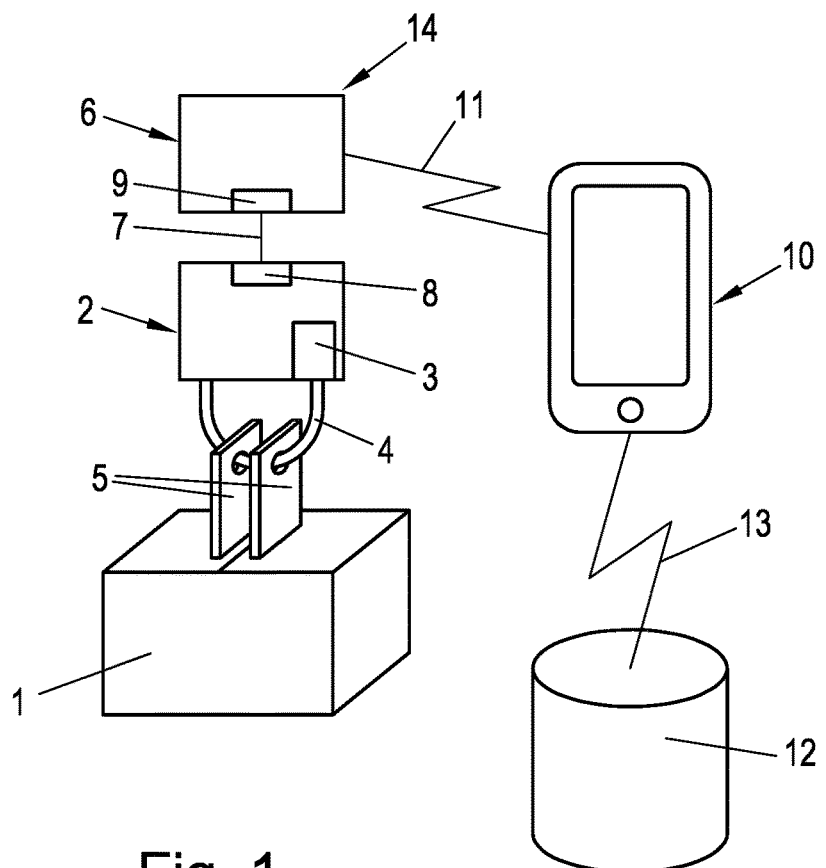

FIG. 1 shows an object 1, which is physically protected by a protection device 2. In the present embodiment the object 1 is a box, e.g. enclosing a product; alternatively the object may be the product itself. The protection device 2 has a controllable actuator 3 for engaging and releasing physical protection of the object 1. To achieve the physical protection of the object 1, the protection device 2 comprises a yoke 4 to form a padlock.

In the present example, the object 1 is protected in that the yoke 4 traversing mountings 5 on the object 1 is locked in a closed position by means of the protection device 2 and specifically the actuator 3. In order to suspend the physical protection of the object 1, the actuator 3 can be controlled to release the yoke 4 from its locked position and may then be removed from the mountings 5. Once the mountings 5 are released from the yoke 4, the box forming the object 1 may be opened, i.e. the object is no longer physically protected.

The protection device 2 is connected to a dongle 6 over a wired data connection 7. The wired data connection 7 is formed between a first spring connector 8 of the protection device 2 and a second spring connector 9 of the dongle 6. The wired data connection 7 supports the I2C computer bus protocol. The dongle 6 is also connected with a host device 10, e.g. a smartphone, tablet or personal computer, over a wireless data connection 11. The wireless data connection 11 can be a Bluetooth connection; other wireless communication standards or protocols are conceivable, e.g. a WiFi or NFC connection. Finally the host device 10 is connected to an on-line public transaction directory 12 over a mixed, partially wireless and partially wired, data connection 13 established via the internet. For simplicity, FIG. 1 shows only a first section of the mixed data connection 13, which is indicated as a wireless connection. The public transaction directory 12 is indicated as a single database. In practice, the database is connected to multiple additional distributed databases, together forming a distributed public directory.

Together the protection device 2 and the dongle 6 form a set 14 for physically protecting the object 1.

Figure 2:
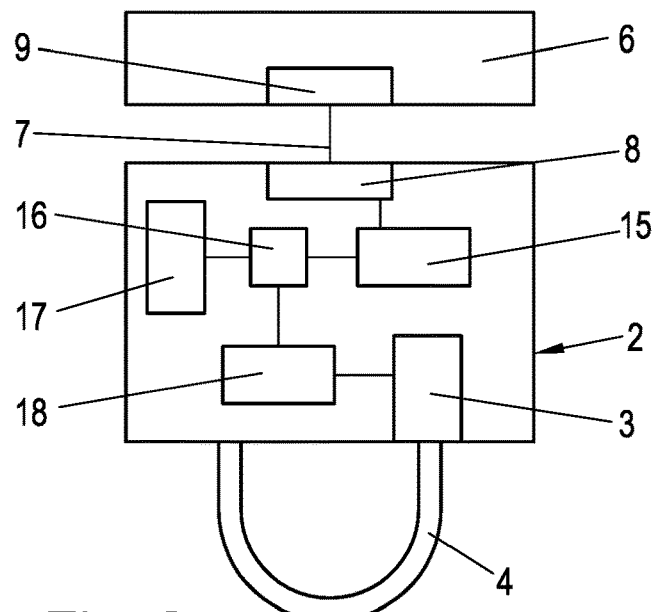
FIG. 2 schematically shows a more detailed view of a protection device according to FIG. 1.

The structure and functionality of the protection device 2 is shown in more detail in FIG. 2. As previously mentioned, the protection device 2 comprises the actuator 3 and the spring connector 8. The spring connector 8 is connected to a microcontroller 15. The microcontroller 15 is connected to a cryptographic integrated circuit (Crypto-IC) 16, e.g. "ATECC508A" by Atmel Corporation or a similar device. The Crypto-IC 16 is connected to a wireless communication integrated circuit 17, in particular to a NFC-IC, e.g. "NT3H1201" by NXP Semiconductors. The Crypto-IC and the NFC-IC are mounted on a flexible circuit board and configured to communicate using the I2C computer bus protocol. Moreover the Crypto-IC 16 is connected to a relay 18 for controlling the actuator 3. The actuator 3 can be switched between an closed state and an open state. The actuator 3 comprises a drive means, such as an electromotor, a mechanical spring, a piezoelectric element and/or an electromagnet. The components of the protection device 2 can be powered either via the dongle 6 connected to the spring connector 8 or via an induction field of an NFC reader (not shown) via the NFC-IC 17.

The spring connector 8 of the protection device 2 may be replaced or combined with a smart card connector or a wireless connector, such as a NFC antenna and integrated circuit, for providing a connection with the dongle 6 and/or the host device 10.

The NFC-IC 17 of the protection device 2 stores an elliptic curve public key associated with the dongle 6, a copy of a smart future contract and a link to a mobile phone app for controlling the protection device 2 and the dongle 6, to be used with the validation, in an internal tamper-proof memory. The dongle 6 is thus associated with the protection device 2 in that the protection device 2 will rely on the stored public key and will validate the dongle 6 only if it is able to prove its possession of the corresponding private key. The NFC-IC 17 provides an alternative wireless interface for mobile phones to the validation process as outlined below.

Figure 3:
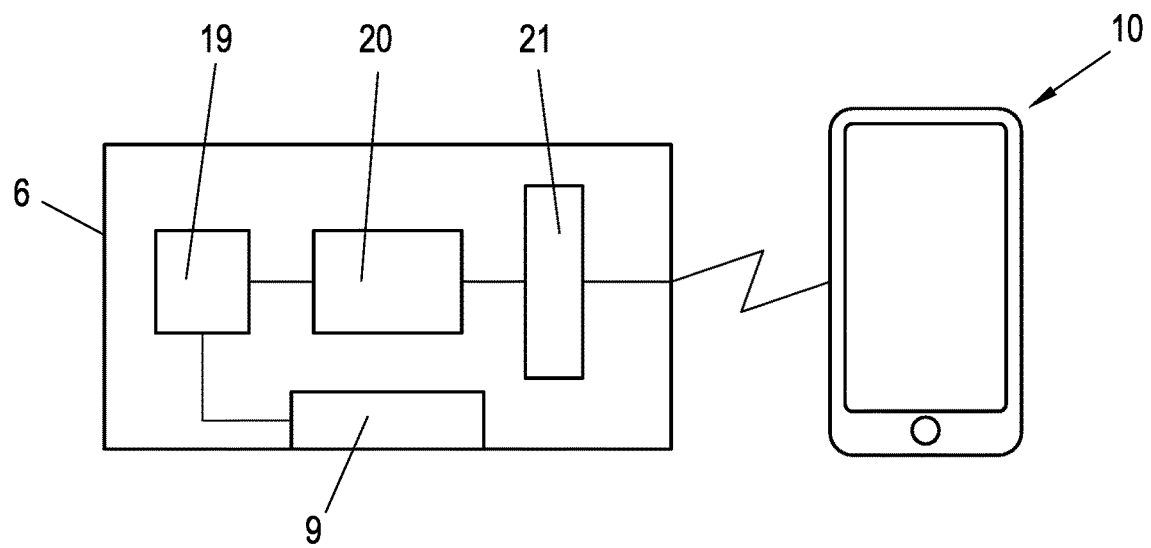
FIG. 3 schematically shows a more detailed view of a dongle according to FIG. 1.

The structure and functionality of the dongle 6 is shown in more detail in FIG. 3. The spring connector 9 of the dongle 6 is connected to a Crypto-IC 19. The Crypto-IC 19 may be a "ATECC508A" by Atmel Corporation. The Crypto-IC 19 is connected to a microcontroller 20 (MCU), e.g. "Atmega256rfr2" or "AtSAMD21" by Atmel Corporation. The MCU 20 may include an IEEE 802.15.4 (WPAN) module for supporting a network connection with the host device 10 over the wireless connection 11. The MCU 20 is connected to a wireless communication module 21, in particular a Bluetooth module, e.g. the "Bluetooth Low Energy breakout board" by Adafruit Industries, LLC, or an NFC module.

The MCU 20 is connected to the wireless communication module 21 via SPI (MISO, MOSI, SCLK, SS) protocol and to the Crypto-IC 19 via I2C protocols. The MCU talks to the components of the protector device via an I2C computer bus connection over the wired connection 7. The dongle 6 also powers the protection device 2 across the wired connection 7. The dongle uses Bluetooth Advertising Mode of the wireless communication module 21 to connect to host devices 10, such as mobile phones and computers, to handle the validation processes. As the wireless communication module 21 is implemented as a dynamic transponder (the MCU can also read/write to the wireless communication module 21), during the validation or as a result of the validation, data on the wireless communication module 21 can be rewritten.

The spring connector 9 of the dongle 6 may be replaced or combined with a smart card connector or a wireless connector, such as an NFC antenna and integrated circuit, for providing a connection with the protection device 2 and/or the host device 10.

The host device 10 comprises a wireless communication module (not shown) for establishing the wireless connection 11 and communicating with the dongle 6. The host device 10 can access and run a specialized program application for performing a validation process together with the dongle 6 and the protection device 2 in order to suspend the physical protection of the object 1 and make the object 1 accessible.

Figure 4:
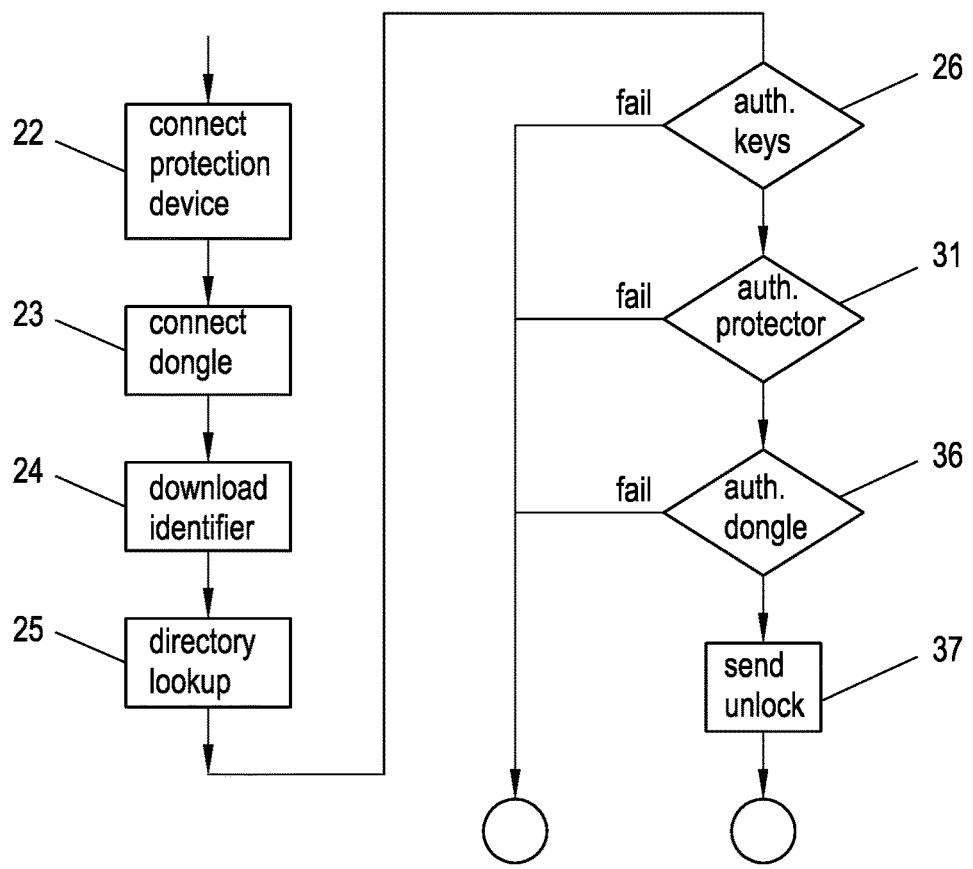
FIG. 4 shows a flow-chart of the general steps performed before suspending the physical protection according to the inventive method.

The steps of a preferred method for suspending the physical protection of the object 1 are outlined in connection with FIG. 4. In a first step 22, the wired data connection 7 between the protection device 2 and the dongle 6 is established by wiring the spring connectors 8, 9. The dongle 6 advertises availability for a wireless connection either permanently or only when it is connected to the protection device 2. The host device 10 establishes the wireless data connection 11 to the dongle 6 (step 23). Then (step 24) the host device receives from the dongle 6 via the wireless data connection 11 a public key of the protection device, a public key of the dongle and a public key of a signatory as well as a signed combined identifier incorporating at least the public keys of the protection device 2 and the dongle 6. The signed combined identifier is signed with a private key of the signatory, which is cryptographically associated with its public key. The information received from the dongle 6 is stored in an internal memory of the dongle 6 within the MCU 20. It is provided by the MCU 20 to the host device 10 when the wireless data connection 11 is established.

Once the host device 10 has access to the combined identifier, it establishes or uses a pre-established mixed data connection 13 to access the public transaction directory 12 (step 25). Specifically it requests via the mixed data connection 13 a search of transactions associated with the signed combined identifier within the public transaction directory 12. Upon this request the public transaction directory 12 performs the requested search and returns all transactions matching the provided identifier.

Figure 5:
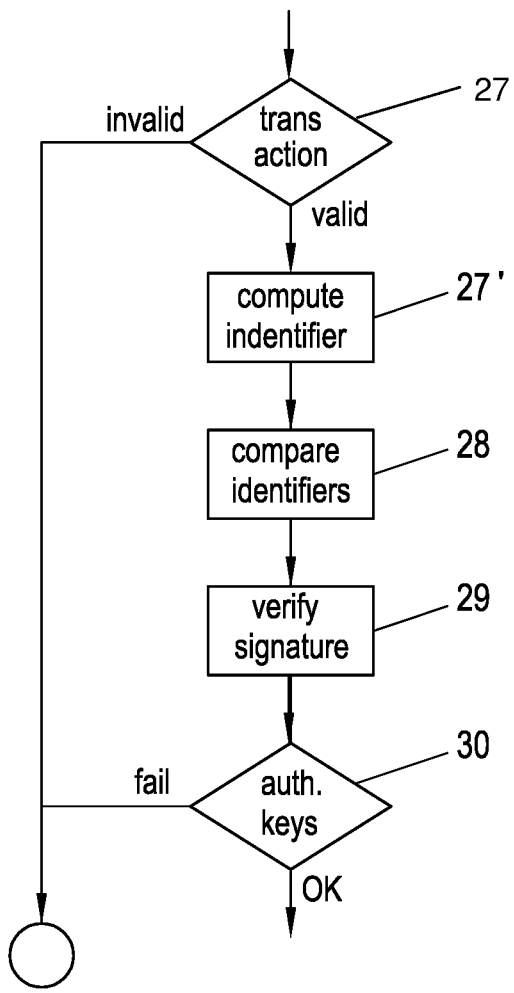
FIG. 5 shows in more detail the steps performed for authenticating the public keys of the protection device and the dongle.

The host device 10 authenticates (step 26) the received public keys of the protection device 2 and the dongle 6 by evaluating the transaction received from the public transaction directory 12 and by using the signature of the signed combined identifier and verifying that signature with the public key of the signatory. The particular steps performed by the host device 10 to authenticate the two public keys are shown in FIG. 5. First (step 27), the host device awaits and evaluates a response from the public transaction directory 12. If there is no registered transaction matching the provided combined identifier, the latter is found invalid and the authentication of the public keys fails. Otherwise (step 27') the host device 10 computes and thereby reproduces the combined identifier from the two public keys. Then (step 28) it compares the computed combined identifier with the signed combined identifier and stores the result of this comparison. In the next step (step 29), the host device verifies the signature of the provided signed combined identifier with the public key of the signatory. Specifically the host device 10 computes a hash of the computed combined identifier, encrypts the provided signature with the public key and compares the hash resulting from the encryption with the previously computed hash. Finally (step 30) the host device 10 positively authenticates the two public keys if the two compared combined identifiers match and the compared hashes match. Otherwise the authentication fails and the validation procedure is terminated (see FIG. 4).

Figure 6:
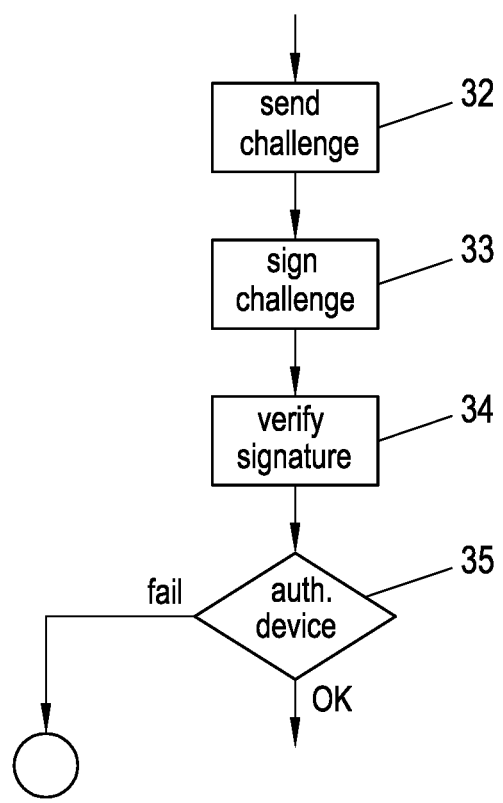
FIG. 6 shows in more detail the steps performed for authenticating the protection device or the dongle.

Once the public keys are found to be authentic, the host device 10 proceeds (step 31) to authenticate the protection device 2 using the authenticated public key of the protection device. The particular steps performed by the host device 10 to authenticate the protection device 2 are shown in FIG. 6. In particular, for authenticating the protection device 2 by the host device 10, the host device 10 first (step 32) sends a random challenge to the protection device 2. The challenge is a practically unpredictable string of bytes or letters generated using a random number generator. After generation, this challenge is transmitted from the host device 10 to the dongle 6 and forwarded by the dongle 6 to the protection device 2. The protection device 2 signs (step 33) the random challenge received from the host device 10 using a private key embedded in the protection device 2, i.e. stored in an internal tamper-proof memory of the protection device 2. This private key is cryptographically associated with the public key of the protection device 2, which the host device 10 has already received from the dongle 6 and authenticated. Specifically the protection device 2, using the Crypto-IC 16, encrypts the received challenge with the private key and sends the resulting signature of the random challenge back to the host device 10, again via the dongle 6. The host device 10 verifies (step 34) the signature received from the protection device 2 with the previously authenticated public key of the protection device by decrypting the received signature with the public key and comparing the result with the initially generated challenge. If (step 35) the challenges match, the verification of the signature succeeds and the host device 10 positively authenticates the protection device 2.

When the protection device 2 has been successfully authenticated, the host device 10 authenticates the dongle 6 (step 36 in FIG. 4). The authentication of the dongle 6 is similar to the authentication of the protection device 2. Therefore it is referred to the above description and FIG. 6, which applies analogously to the authentication of the dongle 6.

Once the protection device 2 and the dongle 6 have both been found authentic based on the authentic public keys, the host device 10 sends (step 37) an unlock request to the dongle 6 via the wireless data connection 11.

As shown in FIG. 7, the dongle 6, after receiving the unlock request from the host device 10 (step 38), in reaction executes (step 39) a contract script. The contract script is stored in an internal memory of the dongle 6, in particular an internal memory of the MCU 20, which also interprets and executes the contract script. The content of the contract script may be secured by mutual signatures of the protection device 2 and the dongle 6, which can be exchanged and verified by the dongle 6 prior to the execution of the contract script. By executing the contract script, the dongle 6 evaluates a condition for unlocking the protection device 2 encoded within the contract script. The dongle 6 then compares (step 40) the outcome of this evaluation with an expected positive outcome. If this comparison results in a match, the dongle sends (step 41) an unlock command via the wired data connection 7 to the protection device 2. The unlock command is signed with the private key of the dongle 6 and sent together with the public key of the dongle 6 and a copy of the stored contract script signed with the private key of the protection device 6 (i.e. the signature is created during initialization of the protection device and dongle and stored within the dongle).

Optionally, is indicated by step 42 in FIG. 7, the dongle 6 invalidates or resets its internal memory and/or the internal memory of the protection device 2 after or at the same time of sending the unlock command (step 41).

As shown in more detail in FIG. 8, the protection device 2 receives (step 43) together with the unlock command the public key of the dongle 6 and the signed contract script via the wired data connection 7. In order to ensure that only legitimate unlock commands are executed by the protection device 2, the protection device 2 verifies whether a received unlock command comes from a trusted dongle by performing the following validation of the received unlock command and signed contract script. It loads (step 44) a stored local copy of the contract script from its internal memory. Then it signs (step 45) the local copy of the contract script with its private key. By comparing the resulting self-signed contract script with the received signed contract script, the protection device 2 validates (step 46) the received signed contract script. If the two are identical, the received signed contract script is found valid. Otherwise the received signed contract script is found invalid and the unlock procedure is cancelled. Only when the validation of the received signed contract script was successful, the protection device 2 triggers the unlock procedure and suspends the physical protection of the protected object by controlling (step 47) the actuator 3 of the protection device 2 to suspend the physical protection of the protected object 1.

In order to be used in the validation and authentication process as described above, the protection device 2 and the dongle 6 are initialized during an initialization process.

The key pair of the signatory, an optional key pair of a producer and an optional key pair of a future owner are assumed as prerequisites of this initialization process to already exist. Then in a first step, the Crypto-ICs 16, 19 of the dongle 6 and the protection device 2 are used to generate a respective key-pair of the two devices 2, 6. After generation, the private keys are securely stored in a tamper-proof internal memory and the public keys are accessible. Then, using all involved public keys, the combined identifier is computed and signed by the signatory to obtain the signed combined identifier. This signed combined identifier is then transmitted to the dongle 6 and stored in its internal memory. In addition a transaction is submitted to the public transaction directory, for example the Bitcoin block-chain. This transaction may for instance transfer a small amount of Bitcoins from an address controlled by the signatory to an address derived from the combined identifier, thereby certifying the legitimacy of the latter. In this instance the combined identified may be a multi-signature address computed from the public keys of the protection device, of the dongle, of the signatory, optionally of the original producer of a product and optionally of a contract script hash. As an additional security measure a signature of the combined identifier generated by the signatory may be embedded in the transaction. The dongle 6 and the protection device 2 both store the public key of the signatory in a protected datazone for future validation. Additionally they may also store the public key of the original producer. If a contract script is used, signed versions of the contract script may be exchanged between the dongle 6 and the protection device 2 for further security. Specifically, the contract script may get hashed and signed two times. A contract script hash signed with the private key of the dongle gets written to the memory of the protection device and a contract script hash signed with the private key of the protection device gets written to the memory of the dongle. Then the Crypto-ICs 16, 19 of the dongle 6 and the protection device 2 are locked, meaning that the stored keys and signatures can no longer be overwritten. The such prepared dongle 6 and protection device 2 are then delivered to the producer who can apply the protection device 2 to an object 1 to be protected and activate/lock the protection device 2 on the object 1 before distributing the protected object to vendors or consumers.

The invention claimed is:

1. A method for suspending a physical protection of an object achieved by a protection device, comprising the following steps:
   establishing a first data connection between the protection device and a dongle;
   establishing a second data connection between a host device and the dongle;
   establishing a third data connection between the host device and a public transaction directory;
   receiving by the host device via the second data connection at least a first public key, a second public key, a third public key and a signed combined identifier incorporating at least the first public key and the second public key, wherein the second public key is different from the first public key, wherein the third public key is different from the first public key and from the second public key, wherein the signed combined identifier is signed with a third private key, which third private key is cryptographically associated with the third public key;
   requesting by the host device via the third data connection a search of transactions associated with the signed combined identifier within the public transaction directory;
   authenticating by the host device at least the first public key and the second public key using a signature of the signed combined identifier and using the third public key;
   authenticating by the host device the protection device using the first public key;
   authenticating by the host device the dongle using the second public key;
   responsive to determining that the search of the public transaction directory yields at least one transaction and that the first public key and second public key are authentic and that the protection device is authentic and that the dongle is authentic, sending by the host device an unlock request to the dongle via the second data connection;
   receiving by the dongle the unlock request;
   generating, in reaction to receiving the unlock request, by the dongle an unlock command;
   signing by the dongle the generated unlock command using a second private key, which is cryptographically associated with the second public key and stored in an internal memory of the dongle;
   sending by the dongle the signed unlock command via the first data connection to the protection device;
   receiving by the protection device the signed unlock command via the first data connection from the dongle;
   authenticating by the protection device the received unlock command using a signature of the received unlock command and using the second public key;
   responsive to determining that the received unlock command is authentic, controlling by the protection device an actuator of the protection device to suspend the physical protection of the protected object.

2. The method according to claim 1, wherein authenticating at least the first public key and the second public key by the host device using the signature of the signed combined identifier and using the third public key comprises:
   computing by the host device a combined identifier from at least the first public key and the second public key;
   comparing by the host device the computed combined identifier with the signed combined identifier;
   verifying by the host device the signature of the signed combined identifier with the third public key;
   responsive to determining that the two compared combined identifiers match and that the verification of the signature succeeds, authenticating by the host device at least the first public key and the second public key.

3. The method according to claim 1, wherein authenticating the protection device by the host device comprises:
   sending by the host device a random challenge to the protection device via the second data connection from the host device to the dongle and from there further on via the first data connection to the protection device;
   signing by the protection device the random challenge using a first private key, which is cryptographically associated with the first public key and stored in an internal memory of the protection device;
   sending by the protection device the signature of the random challenge to the host device via the first data connection to the dongle and from there via the second data connection to the host device;
   verifying by the host device the signature with the first public key and, responsive to determining that the verification succeeds, authenticating the protection device.

4. The method according to claim 3, comprising:
   invalidating or resetting, after receiving the unlock command from the dongle, by the protection device the internal memory of the protection device.

5. The method according to claim 3, wherein the internal memory of the protection device and/or of the dongle is a tamper-proof memory.

6. The method according to claim 1, wherein authenticating the dongle by the host device comprises:
   sending by the host device a random challenge to the dongle via the second data connection;
   signing by the dongle the random challenge using the second private key;
   sending by the dongle the signature of the random challenge to the host device via the second data connection;
   verifying by the host device the signature with the second public key and, responsive to determining that the verification succeeds, authenticating the dongle.

7. The method according to claim 6, comprising:
   invalidating or resetting, after sending the unlock command, by the dongle the internal memory of the dongle.

8. The method according to claim 1, comprising:
   receiving by the dongle the unlock request and in reaction executing a contract script stored in an internal memory of the dongle,
   evaluating by the contract script at least one condition for unlocking the protection device,
   sending by the dongle the unlock command only after determining that the contract script executes successfully and that the at least one condition of the contract script is fulfilled.

9. The method according to claim 1, comprising:
   receiving by the protection device a signed copy of a contract script via the first data connection,
   loading by the protection device a stored local copy of the contract script from an internal memory of the protection device,
   signing by the protection device the local copy with the first private key, comparing by the protection device the resulting self-signed copy of the contract script with the received signed copy of the contract script and suspending by the protection device the physical protection of the protected object only after determining that the compared signed contract scripts are identical.

10. The method according to claim 1, wherein the first data connection is a wired data connection, and/or the second data connection is a wireless data connection.

11. The method according to claim 10, wherein a first data connection interface of the protection device and a second data connection interface of the dongle support an Inter-Integrated Circuit protocol, and/or wherein a third data connection interface of the dongle is a Bluetooth connection interface.

12. The method according to claim 1, comprising:
establishing the third data connection via the internet.

13. The method according to claim 1, wherein the public transaction directory is a distributed public directory.

14. The method according to claim 13, wherein the public transaction directory is a Bitcoin block chain.

\* \* \* \* \*